(12) United States Patent
Singh et al.

(10) Patent No.: US 8,650,059 B2
(45) Date of Patent: Feb. 11, 2014

(54) METHOD AND APPARATUS FOR ROLE-BASED PRESENTATION OF INFORMATION

(75) Inventors: Sumit Singh, Irving, TX (US); Javier Martinez, Coppell, TX (US); Sridhar Musunuru, Irving, TX (US); Williams Rajkumar, Irving, TX (US); Pritam Bedse, Irving, TX (US); Mukaram Aziz, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1839 days.

(21) Appl. No.: 11/553,929

(22) Filed: Oct. 27, 2006

(65) Prior Publication Data

US 2010/0191554 A1    Jul. 29, 2010

(51) Int. Cl.
*G06Q 10/00* (2012.01)
*G06Q 10/06* (2012.01)
*G06Q 10/10* (2012.01)

(52) U.S. Cl.
CPC .... *G06Q 10/063114* (2013.01); *G06Q 10/1093* (2013.01)
USPC ........................................ 705/7.15; 705/7.18

(58) Field of Classification Search
None
See application file for complete search history.

(56) References Cited

U.S. PATENT DOCUMENTS

| | | | |
|---|---|---|---|
| 5,930,764 A * | 7/1999 | Melchione et al. | 705/7.29 |
| 6,067,525 A * | 5/2000 | Johnson et al. | 705/7.13 |
| 6,236,977 B1 * | 5/2001 | Verba et al. | 705/7.32 |
| 6,442,693 B1 * | 8/2002 | Sandgren et al. | 726/4 |
| 6,636,852 B2 * | 10/2003 | Gozdeck et al. | 705/7.42 |
| 6,665,648 B2 * | 12/2003 | Brodersen et al. | 705/7.11 |
| 6,778,651 B1 * | 8/2004 | Jost et al. | 379/201.01 |
| 6,996,212 B1 * | 2/2006 | Baker et al. | 379/88.22 |
| 7,340,410 B1 * | 3/2008 | Vaillancourt et al. | 705/7.15 |
| 7,379,064 B2 * | 5/2008 | Raffel et al. | 345/440 |
| 7,516,088 B2 * | 4/2009 | Johnson et al. | 705/16 |
| 7,620,564 B1 * | 11/2009 | Lippock | 705/7.29 |
| 2001/0049622 A1 * | 12/2001 | Gozdeck et al. | 705/11 |
| 2002/0035504 A1 * | 3/2002 | Dver et al. | 705/10 |
| 2002/0077998 A1 * | 6/2002 | Andrews et al. | 707/1 |
| 2002/0082892 A1 * | 6/2002 | Raffel et al. | 705/8 |
| 2002/0130904 A1 * | 9/2002 | Becker et al. | 345/753 |
| 2002/0152102 A1 * | 10/2002 | Brodersen et al. | 705/7 |
| 2003/0018490 A1 * | 1/2003 | Magers et al. | 705/1 |
| 2003/0154120 A1 * | 8/2003 | Freishtat et al. | 705/9 |
| 2004/0133876 A1 * | 7/2004 | Sproule | 717/105 |
| 2005/0091156 A1 * | 4/2005 | Hailwood et al. | 705/40 |
| 2005/0091194 A1 * | 4/2005 | Jupp et al. | 707/2 |
| 2006/0047708 A1 * | 3/2006 | Howard | 707/200 |
| 2006/0160566 A1 * | 7/2006 | Plahte et al. | 455/554.1 |
| 2007/0239721 A1 * | 10/2007 | Ullman et al. | 707/9 |
| 2008/0004929 A9 * | 1/2008 | Raffel et al. | 705/8 |
| 2008/0103946 A1 * | 5/2008 | Johnson et al. | 705/30 |
| 2008/0162177 A1 * | 7/2008 | Raffel et al. | 705/1 |

OTHER PUBLICATIONS

ACT! by Sage Collective screenshots from version available as early as 2006.*

* cited by examiner

*Primary Examiner* — Brett Feeney

(57) ABSTRACT

An approach is provided for utilizing role-based presentation interfaces. A role of a user among a plurality of roles is determined. The user is among a plurality of users that are grouped based on the roles. A presentation interface is populated with sales related information based on the determined role.

22 Claims, 11 Drawing Sheets

FIG. 4A

My Home — 401

Work Queue

| | Quote | Proposal | | Requested (Firmed) |
|---|---|---|---|---|
| Assigned | 0 | 0 | On Hold | 25.2 |
| Firmed | 617 | 1 | Unassigned | 221 |
| Expired | 0 | 0 | In Queue | 6 |
| Saved | 1,302 | 577 | Assigned | 63 |
| Declined | N/A | 2 | Pending | 6 |
| Sent | N/A | 163 | In-Progress | 1 |

Calendar — 403

September 2006

| S | M | T | W | T | F | S |
|---|---|---|---|---|---|---|
|  |  |  |  |  | 1 | 2 |
| 3 | 4 | 5 | 6 | 7 | 8 | 9 |
| 10 | 11 | 12 | 13 | 14 | 15 | 16 |
| 17 | 18 | 19 | 20 | 21 | 22 | 23 |
| 24 | 25 | 26 | 27 | 28 | 29 | 30 |

Customize Home Page   Collapse all   Expand all

404

You have 0 tasks

Recent Activity — 405

| My Customers | Sales ID | Date Created | Last Revision | Last Activity |
|---|---|---|---|---|
| NOT AVAILABLE | | 9/21/2006 8:05:44 AM | 9/21/2006 8:05:44 AM | COMMON |
| 1-800 USED CAR CORP | 264_06_100402 | 9/21/2006 7:37:56 AM | 9/21/2006 7:45:01 AM | REQUEST |
| HESPERIA RESORTER | 264_06_100430 | 9/21/2006 7:28:20 AM | 9/21/2006 7:34:17 AM | REQUEST |
| 1-800 USED CAR CORP | 264_06_100201 | 9/21/2006 7:15:35 AM | 9/21/2006 7:22:25 AM | PROPOSAL |
| 1-800 USED CAR CORP | 264_06_100201 | 9/21/2006 7:15:35 AM | 9/21/2006 7:22:25 AM | QUOTE |
| 1-800 USED CAR CORP | 264_06_100201 | 9/21/2006 7:15:35 AM | 9/21/2006 7:22:25 AM | REQUEST |
| 1-800 USED CAR CORP | 264_06_100121 | 9/21/2006 5:43:46 AM | 9/21/2006 5:47:36 AM | PROPOSAL |
| 1-800 USED CAR CORP | 264_06_100121 | 9/21/2006 5:43:46 AM | 9/21/2006 5:47:36 AM | QUOTE |
| 1-800 USED CAR CORP | 264_06_100102 | 9/21/2006 5:28:32 AM | 9/21/2006 5:32:51 AM | OPPORTUNITY |
| 1-800 USED CAR CORP | 264_06_100102 | 9/21/2006 5:28:32 AM | 9/21/2006 5:32:51 AM | PROPOSAL |

My Home

*Assigned* — 501

| Sales ID | Sales Center / Partner Company Name | Queue Name | Account Name | Assigned Date | Product | Activity |
|---|---|---|---|---|---|---|
| 295.06.102416.01 | Test-Sales | TestQ | Bill Name | 10/22/2005 10:00:29 AM | DS1 | New Customer - New BTN |
| 295.06.104612.01 | Test-Sales | TestQ | Bill Name | 10/22/2005 10:00:29 AM | DS3 | New Customer - New BTN |
| 295.06.122764.01 | Test-Sales | TestQ | Javier Martinez | 10/23/2005 10:00:36 AM | FRAME RELAY | New Customer - New BTN |
| 295.06.102421.01 | Test-Sales — 405 | TestQ | Javier Martinez | 10/23/2005 10:00:36 AM | LD PRIVATE LINE | Change |
| 295.06.123322.01 | Test-Sales | TestQ | Bill Name | 10/23/2005 10:00:36 AM | DS3 | New Customer - New BTN |
| 295.06.123391.01 | Test-Sales | TestQ | Bill Name | 10/23/2005 10:00:36 AM | DS1 | New Customer - New BTN |
| 295.06.122461.01 | Test-Sales | TestQ | Javier Martinez | 10/23/2005 10:00:37 AM | LD FRAME RELAY | New Customer - New BTN |
| 295.06.134622.01 | Test-Sales | TestQ | Bill Name | 10/24/2005 10:00:54 AM | DS3 | New Customer - New BTN |
| 295.06.105441.01 | Test-Sales | TestQ | Bill Name | 10/24/2005 10:00:54 AM | LD PRIVATE LINE | New Customer - New BTN |
| 295.06.104421.01 | Test-Sales | TestQ | Javier Martinez | 10/24/2005 12:00:57 PM | LD FRAME RELAY | New Customer - New BTN |

| | UnAssigned | In Queue | Assigned | In Progress | Pending | Jeopardy | Errors | Cancelled | Completed | Final | Total |
|---|---|---|---|---|---|---|---|---|---|---|---|
| Active | - | - | - | 1 | 1123 | - | - | - | 405 | 3 | 1564 |
| Fallout | - | 32 | 177 | 78 | 1213 | 0 | 11 | 834 | 6574 | 1473 | 10416 |
| All Flowthru | - | 32 | 177 | 79 | 2336 | 0 | 11 | 866 | 6979 | 1476 | 11980 |

○ *Flow Thru Requests* — 611

○ *Message and Alerts* — 613

Fallout Rate: 0 — 615

*Ticket Follow-ups* — 617

September 2006

| S | M | T | W | T | F | S |
|---|---|---|---|---|---|---|
| 27 | 28 | 29 | 30 | 31 | 1 | 2 |
| 3 | 4 | 5 | 6 | 7 | 8 | 9 |
| 10 | 11 | 12 | 13 | 14 | 15 | 16 |
| 17 | 18 | 19 | 20 | 21 | 22 | 23 |
| 24 | 25 | 26 | 27 | 28 | 29 | 30 |
| 1 | 2 | 3 | 4 | 5 | 6 | 7 |

B3, 360, and One Source data refresh for account data.
The B3 Refresh to One Source refresh is complete for the week of 9/18. Thank you very much!

600

METHOD AND APPARATUS FOR ROLE-BASED PRESENTATION OF INFORMATION

BACKGROUND INFORMATION

Business organizations rely on accurate and efficient sales processes to ensure profitability. Unfortunately, organizations, in particular large companies, are susceptible to inefficiencies in their processes because of the volume of orders and the numbers of users involved. As a result, a tremendous of amount of information is generated and provided to these users who have to process the sales orders and manage the related activities. The complexity of the sales transaction entails involvement of all types of users. Therefore, the task of transferring the proper information to the appropriate users, at the right moment when the information is useful for decision-making, is a daunting one.

Conventionally, presentation of data is standardized across all user roles, with limited opportunities for specific users to "turn off" or "turn on" portions of the presentation. Additionally, with some component applications, there are no options to isolate the data selected for presentation from those data specific to only a particular user. At the other extreme, individualized interfaces can be developed for each specific user; however, this requires a heavy development cost and perhaps even greater cost to maintain customization of these interfaces, particularly as new users and requirements are introduced.

Therefore, there is a need for timely and efficiently presenting relevant information to users in processing business transactions.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIGS. 4A and 4B are an exemplary graphical user interface (GUI) for a user in the role of a sales agent, according to an exemplary embodiment;

FIGS. 5A and 5B are an exemplary GUI for a user in the role of an implementer of the sales order, according to an exemplary embodiment;

FIGS. 6A-6C are an exemplary GUI for a user in the role of an administrator, according to an exemplary embodiment.

DETAILED DESCRIPTION

An apparatus, method, and software for providing presentation interfaces based on user roles are described. In the following description, for the purposes of explanation, numerous specific details are set forth in order to provide a thorough understanding of the various exemplary embodiments. It is apparent, however, to one skilled in the art that the various exemplary embodiments may be practiced without these specific details or with an equivalent arrangement. In other instances, well-known structures and devices are shown in block diagram form in order to avoid unnecessarily obscuring the exemplary embodiments.

Figure 1:
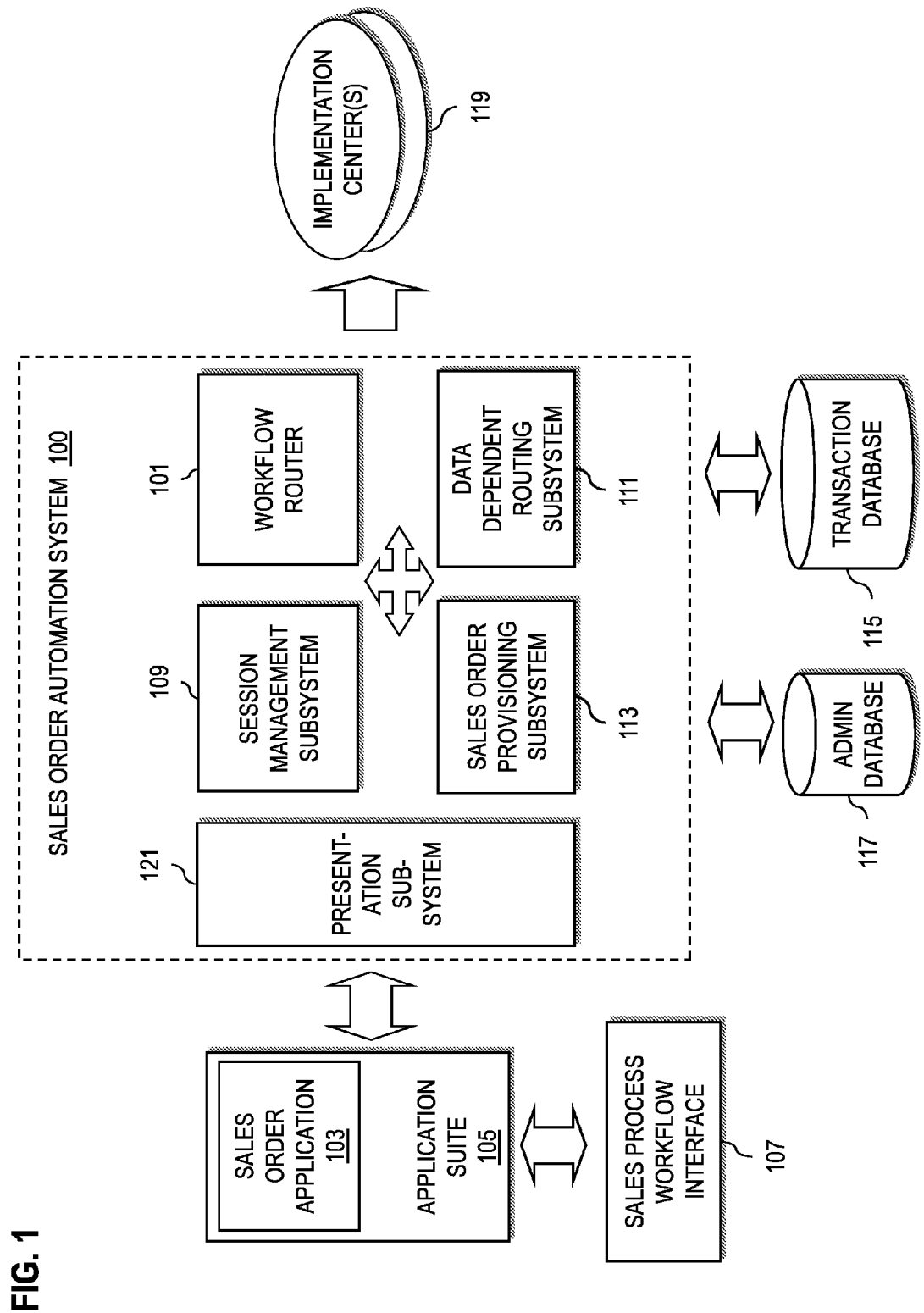
FIG. 1 is a diagram of an automated sales order fulfillment system capable of providing presentation interfaces based on user roles, according with an exemplary embodiment.

FIG. 1 is a diagram of an automated sales order fulfillment system capable of providing presentation interfaces based on user roles, according with an exemplary embodiment. For the purposes of illustration, a presentation mechanism is described with respect to a workflow system configured to support sales activities and transaction. An automated sales force workflow system 100 encompasses a workflow router 101 for distributing sales orders generated from a sales order application 103. The sales order application 103 can be part of an application suite 105 that supports sales and marketing functions, which lead to the fulfillment of sales orders. The application suite 105 can be deployed in multiple sales centers. A user can interact with the application suite 105 using a sales process workflow interface 107 as a front end presentation screen to utilize any number of sales, marketing, and accounting applications. In an exemplary embodiment, the interface 107 is a graphical user interface (GUI), such as a web browser.

At any point in any application, user-entered data related to a sales order may be collected. The system 100 may include a session management subsystem 109 to maintain copies of collected data for persistence across applications, to eliminate, for instance, the need for user re-keying of information, thereby more efficiently conducting transactions. The session management subsystem 109 can pre-populate an interface screen with any previously-collected data related to the sales order. Upon completion of the sales order, the session management subsystem 109 can initiate the order implementation process by forwarding the collected sales order data to data dependent routing subsystem 111.

Among other functions, the data dependent routing subsystem 111 may be used to load balance the transfer of data to the system 100. The subsystem 111 communicates via a sales order provisioning system 113 to deposit the collected data in a transaction database 115.

An administration database (denoted as "admin database") 117 is also maintained to store user profile information and other management information about the system 100. In an exemplary embodiment, the admin database 117 can store business rules and criteria necessary of the workflow router 101 to process the sales orders.

As shown, the workflow router 101 communicates with one or more implementation centers 119 to properly route the sales orders based on the business rules. As such, these implementation centers 119 represent multiple end points for completed order handling. Accordingly, the workflow router 101 performs selection decisions as to avoid mistaken identification of available, capable end points and/or lost parts of a multi-item order.

A presentation subsystem 121 can interact, for example, with the application suite 105 to provide various presentation interfaces to users per the sales process workflow interface 107. The presentation interfaces, in an exemplary embodiment, are supplied to the users based on the roles of the users. Also, the presentation subsystem 121 can restrict the users from access to certain workflow applications by considering the user's role.

According to an exemplary embodiment, users are grouped or classified by their roles—e.g., sales agent, implementer, system administrator, etc. In order to present a user with the proper information at the appropriate time, the responsibilities and job functions of the user need to be accounted for in the grouping. Consequently, application users are grouped logically, such that data that is relevant for each of the groups is identified. According to an exemplary embodiment, multiple levels of logical user grouping are used: sales channel, user type, and title (or role). In one embodiment, "role" can be the lowest level of user groups. The presentation subsystem 121 can consider organizational structure, application capabilities, and user roles independently, thereby enabling scaling independently as well as adaptability to changing business needs.

A predetermined number of groupings is defined to avoid having to customize a presentation interface of each specific user; the exact number of groups depends on the organization's requirements. Hence, the presentation subsystem 121 builds the user interfaces for the individual groups. This logical grouping of users permit building different interfaces for different groups, which is more practical than designing different interfaces for each user. Otherwise, to create a consolidated data presentation for any one specific user interested in viewing all information about a customer or a transaction requires significant effort and investment.

Further complicating the interface build is the requirement to limit, for example, data for viewing only by sales persons who communicate with customer. To replicate this consolidation of data tables and data limitation for hundreds or thousands of sales persons, as is typical of a large organization, compounds the effort to such a degree that a system manager would be inclined to force each user to accept the "standard" view.

In addition to the data and application filtering mechanisms, the presentation subsystem 121 permits the user to arrange the format of the presentation interface. The presentation subsystem 121 is more fully described below, in FIG. 2.

Figure 2:
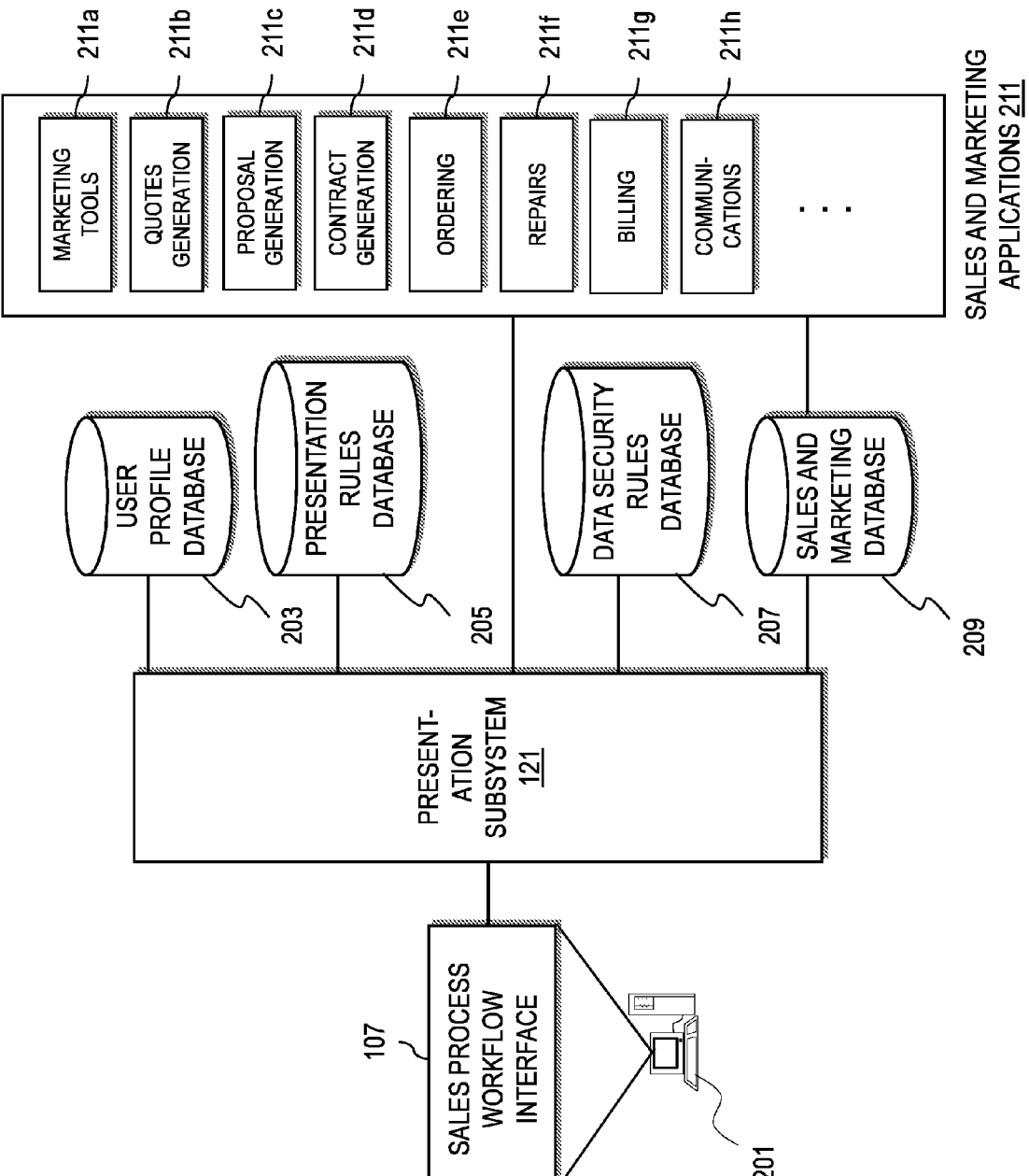
FIG. 2 is a diagram of a presentation system for selectively providing information to users and restricting access to applications, according to an exemplary embodiment.

FIG. 2 is a diagram of a presentation system for selectively providing information to users and restricting access to applications, according to an exemplary embodiment. Under this exemplary scenario, the presentation subsystem 121 has access to a host of databases, including a user profile database 203, a presentation rules database 205, a data security rules database 207, and a sales and marketing database 209. Additionally, the presentation subsystem 121 interfaces with one or more sales and marketing applications 211.

By way of example, the sales and marketing applications 211 include various marketing tools 211a for managing accounts and contacts for tracking sales leads, etc. A quotes generation application 211b enables a user via a computing device or system 201 to prepare sales quotes for a customer. The user can also develop proposals and contracts using the proposal generation application 211c and the contract generation application 211d, respectively. An ordering application 211e supports creation, modification and tracking of sales orders. Other applications include a repairs application 211f to generate trouble tickets and dispatch work force resources, as well as a billing application 211g to ensure invoices resulting from the sales orders are timely produced. Further, a communications application 211h is used to provide various communication media for the user—e.g., facsimile and e-mail capability. As indicated by the figure, any number and type of applications can be utilized depending on the requirements of the organization.

The sales process workflow interface 107 can dynamically be created by the presentation subsystem 121, given the role of a user (who can gain access to the system 100 via the computing system 201). The subsystem 121 utilizes the user profile database 203 to determine that particular role, and connects to the presentation rules database 205 for specific screen display rules for the determined role. For example, rules can be used to determine whether a year-to-date sales report should appear on the screen, at what position, potentially at what level of highlighting, whether such report allows drill-down access, etc.

In one embodiment, the rules can be embedded in full-screen templates. In another embodiment, each screen element (e.g., a specific report, a specific navigation button, etc.) that may possibly be put on the screen are maintained in separate templates, and the inclusion, positioning, etc., of each element is maintained in tables. In yet another embodiment, each screen element is chosen entirely through a table-driven approach, where one of the tables maintains an element identifier and an element type (e.g., report, navigation button, etc.) that is pre-defined and created as required.

Once screen elements (or sections) are determined, the presentation subsystem 121 retrieves data to populate these sections, customized to the role of the specific application user. The presentation subsystem 121 also refers to the data security rules database 207 for information on how to retrieve the data. Along with displaying the relevant useful information to the user, the presentation subsystem 121 can prohibit a user from viewing restricted data as per the role of the user. For example, a sales person should not be allowed to view a peer's sales funnel on which the compensation depends, but can view the peer's work queue (case information). Also, a sales manager may not be privy to the tasks of a user who is an administrator, as confidential data may be present. Accordingly, the presentation subsystem 121 discerns the various roles of sales agent, team leader, order implementer, administrator, etc. Traditionally, users would have access to all redundant and confidential information irrespective of their roles.

Various embodiments can be used for storing and providing screen data population rules. In one embodiment, the rules are template database retrieval calls, such as Structured Query Language (SQL) SELECT statements, and the parameters of the retrieval calls are derived from the user profile. Alternatively, the rules can be descriptors on how to build the retrieval call, and such call is built programmatically as needed. In yet another embodiment, a superset of data is retrieved automatically and the rules serve to describe how a subset of the data intended for the specific user may be culled from the superset.

The location of the data to be retrieved is within the sales and marketing database 209, in which one or more tables in the database 209 maps to one or more of the sales and marketing applications 211.

The operation of the presentation subsystem 121 is next described.

Figure 3:
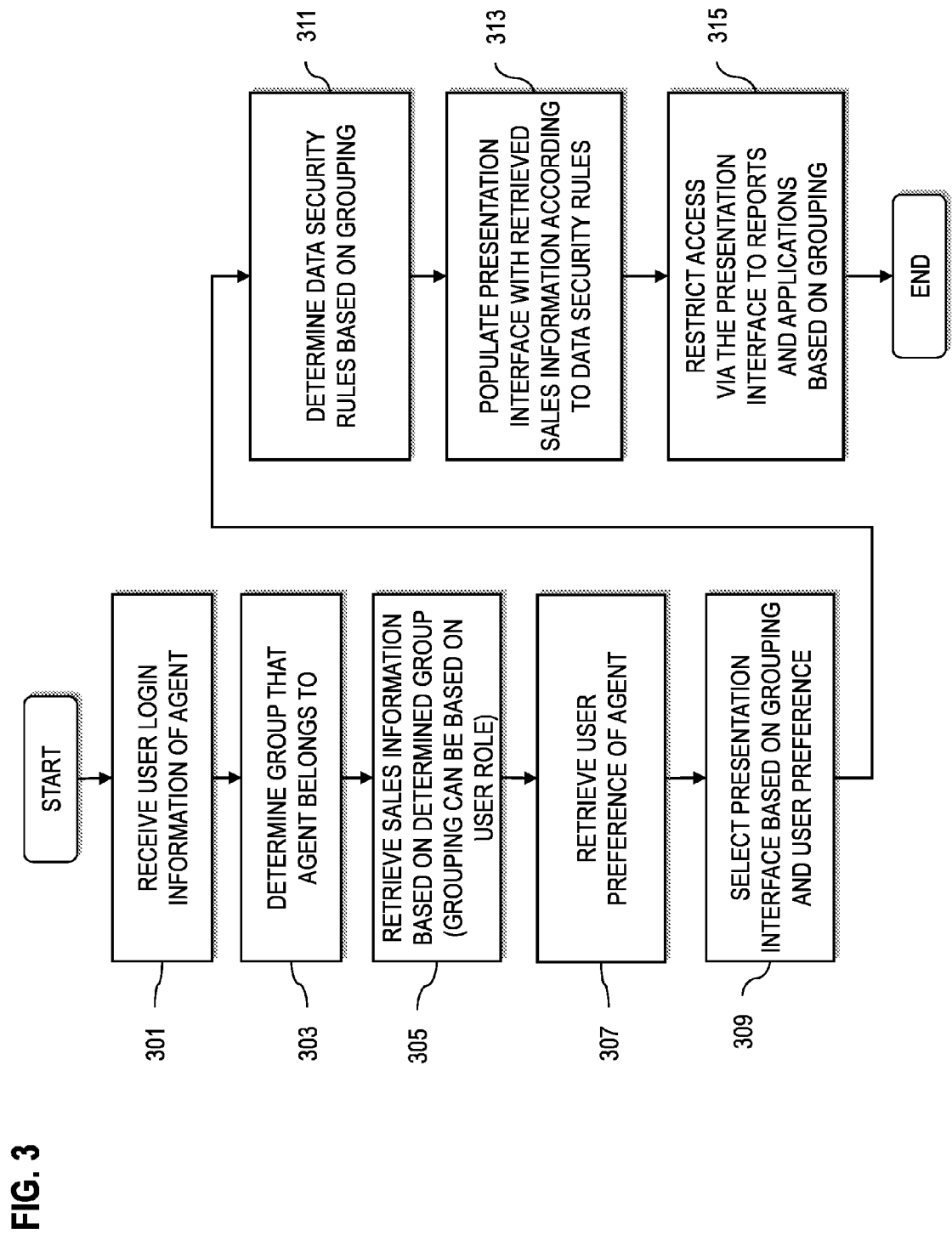
FIG. 3 is a flowchart of a process for populating a presentation interface based on user role and preference, according to an exemplary embodiment.

FIG. 3 is a flowchart of a process for populating a presentation interface based on user role and preference, according to an exemplary embodiment. For the purposes of explanation, this process is described in the context of a sales agent seeking to obtain sales information from the system of FIG. 2. In step 301, the agent using the computing device 201 performs a login, thereby triggering the determination of the group to which the agent (step 303) belongs. This determination requires obtain information from the user profile database 203. For example, the information can include a group identifier, a role identifier (e.g., sales agent, sales administrator, order implementer, etc.) characterizing that particular user, which in this example is a sales agent, as well as other identification information. As mentioned, users can be grouped using various grouping criteria, such as role (or title), type of user, or the sales channel associated with the users. For sales persons (or agents), it is sometimes required that the lowest level sales representative may only be able to see his or her sales orders to date this year, while a regional sales manager may be able to see the sales orders of all sales representatives in his or her region. The data retrieved in this example, then, can include a value indicating the level of the sales representative and the associated region, division, etc., of coverage. Therefore, the presentation subsystem 121 allows for gradations within a specific role. In this embodiment, the screen elements to be included can be the same across all members of the sales force, while the data populating the screens are more or less inclusive depending on the level of the user within the sales force. According to another embodiment, there may instead be multiple roles defined within the sales force, such that regional sales managers will view different screen elements.

Any number of parameters may be employed to provide further granularity to the population of a screen presentation, in addition to the two parameters of role within the sales and marketing organization, and level within the specific role. In an exemplary embodiment, another parameter for further granularity could be the sales channel of the agent. For instance, many enterprises allow individuals external to the organization to gain access to the enterprise's sales and marketing data, but may desire to make further limitations. Thus, for example, a sales representative at a non-affiliated sales representative organization may be restricted from seeing data intended for internal personnel only (e.g., pricing discussions).

Next, sales information is retrieved from the sales and marketing database 209 based on the determined group, as in step 305. At this point, the presentation subsystem 121 can accommodate any user preferences associated with the agent by retrieving such preferences, per step 307, from the user profile database 203.

In step 309, the presentation subsystem 121 selects the presentation interface based on the grouping (which could have been defined based on user role) and the user preference of the agent. Specifically, the presentation subsystem 121 can provide the sales process interface 107 with the screen presentation elements, formats and arrangement, etc. These elements can be supplied based on defined rules; a rule may specify that a screen can be preliminarily populated before all the information is obtained. Additionally, data security rules can be obtained and applied, per step 311, based on the grouping. It is contemplated that further rules can be applied based on characteristics of the particular user as well. As described previously, such rules serve to limit access to data depending on the role and level of the user within the organization (or external to the organization, if such access is provided). In step 313, the presentation interface is populated with the retrieved sales information according to the data security rules.

Furthermore, the presentation subsystem 121 can restrict access via the presentation interface to reports and applications based on the agent's group (which is effectively the role, in this example), per step 315. For instance, navigation buttons can be provided or not provided to control access; that is, a navigation button is not made available where access to the end-point of that navigation is restricted for the specific role.

Thus, the presentation subsystem 121 allows for a multi-parameter setting of the initial screen presentation, driven by a role-based determination of the application user. FIGS. 4-6 are sample initial screen presentations of the result of the process of FIG. 3, for a user in a sales role, implementation role, and sales and marketing administration role, respectively.

Figure 4B:
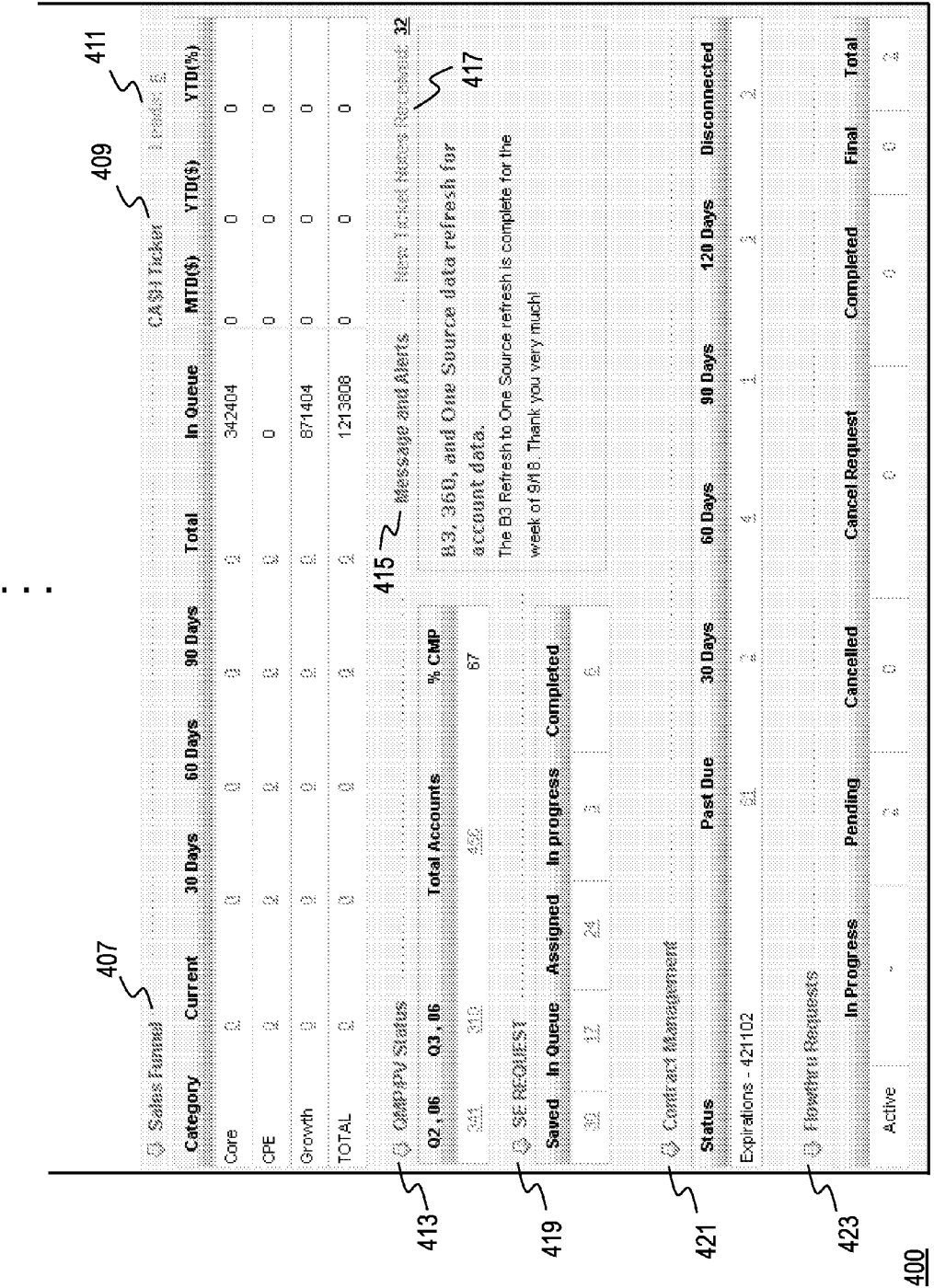

FIGS. 4A and 4B are an exemplary graphical user interface (GUI) for a user in the role of a sales agent, according to an exemplary embodiment. As shown, a sales agent screen 400 has a section 401 that is designated for a work queue of the sale agent. The section 401 includes information about the number of quotes and proposals the agent has initiated or is otherwise responsible for. The work queue is defined, for example, in the following categories: Assigned, Firmed, Expired, Saved, Declined, and Sent. This section 401 can be populated differently if the agent had a different role—e.g., a sales manager versus a sales representative. The work queue section 401 also includes an area presenting details about requested (firmed) orders; such details include the number of orders in the following states: On-hold, Unassigned, In Queue, Assigned, Pending, and In-progress.

Section 403, which in this example is a calendar, is illustrative of an application that may or may not be available to all users. A text box 404 is provided to display textual information about missed or queued communications (e.g., faxes, emails, voice mails, etc.) with the agent.

Section 405 ("Recent Activity" area) provides an activities report that specifies the customer identification (ID), sales ID, date the order was created, when the order was last revised, and the last activity associated with the order.

The screen 400 further includes a sales funnel section 407 that lists the sales orders by category (e.g., core, Customer Premises Equipment (CPE), growth, etc.). The other associated fields provide numerical values for the number of sales orders within each of the time periods: Current, 30 Days, 60 Days, and 90 Days. Also, a total column is shown, along with the number of sales orders In Queue. Further, monetary statistics can be provided via a Cash Ticker section 409: month-to-date (MTD), year-to-date (YTD), and YTD percentage. Further, a Leads section 411 is shown to indicate the number of leads specified for the agent.

Additionally, the screen 400 includes a QMP/PV status section 413 that details quarterly sales information. Section 415 ("messages and alerts") displays alerts, and is another example information that is likely to vary depending on the user role—e.g., an external sales user may not have equivalent access (e.g., to sensitive, internal-eyes-only messages or alerts). Section 417 specifies information on how many new ticket notes have been received.

This presentation interface also provides information about requests from the sales engineer (SE) in section 419; namely, the number of order that are Saved, In Queue, Assigned, In progress, or Completed. A contract management section 421 provides information about the contracts that are being handled by the agent; such information include the status, as well as how many are past due, within 30 days, 60 days, 90 days, 120 days or disconnected.

Further, a section 423 is provided for flow through requests. The section 423 provides the following fields: In Progress, Pending, Cancelled, Cancel Request, Completed, Final, and Total.

Figure 5B:
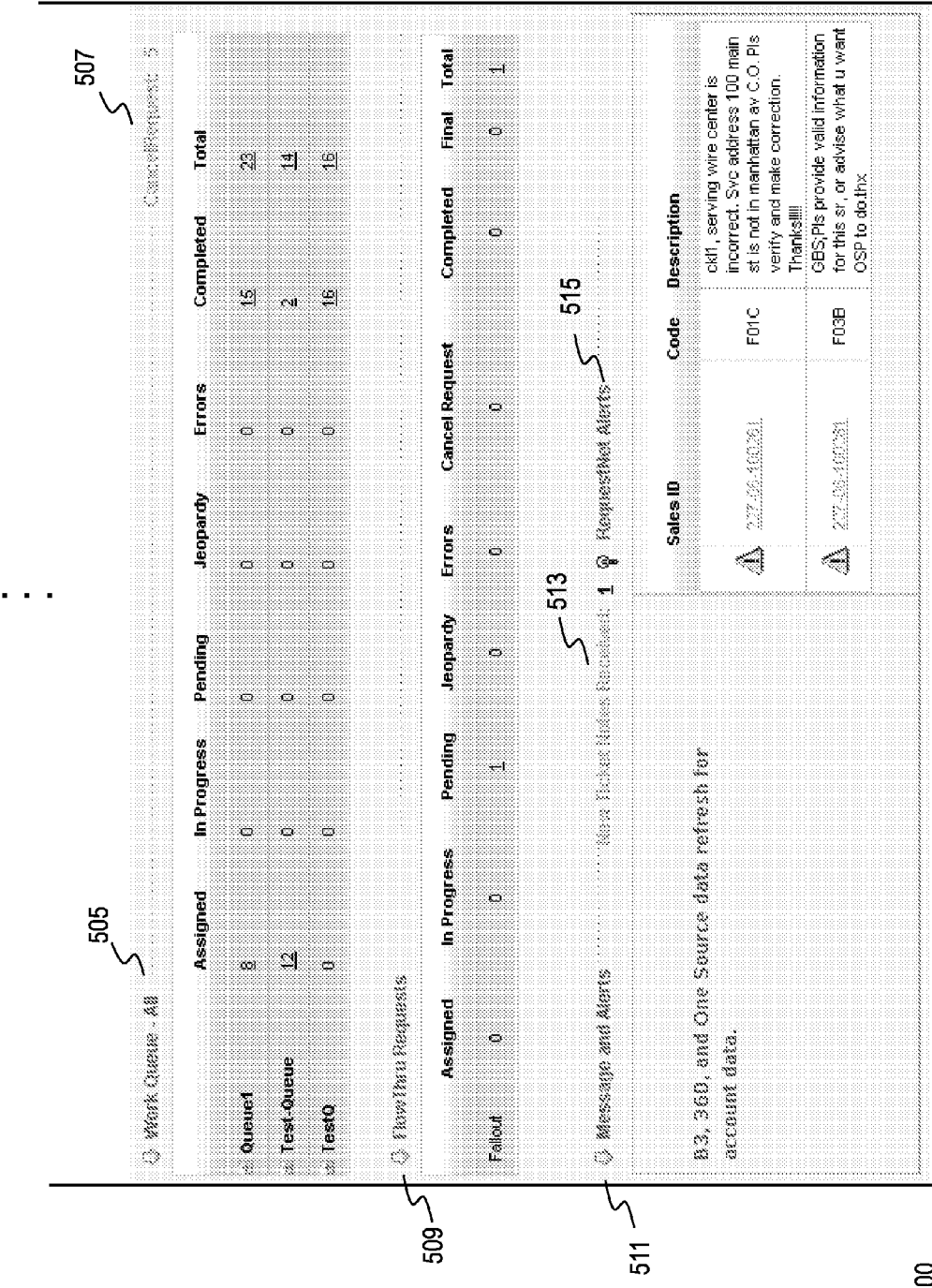

FIGS. 5A and 5B are an exemplary GUI for a user in the role of an implementer of the sales order, according to an exemplary embodiment. In this example, screen 500 provides a user with the role of an implementer of the sales order with a section 501 that enumerates the sales orders that have been assigned. The report includes the following information: Sales ID, Sales Center/Partner Company Name, Queue Name, Account Name, Assigned Date, Product, and Activity. Section 503 provides the user with information on how many orders have been rejected.

The screen 500 also includes, as shown in FIG. 5B, a work queue section 505 that indicates how many orders in all work queues that have been Assigned, In progress, Pending, Jeopardy, Errors, and Completed. A Total field is also displayed. Section 507 shows the number of order requests that have been cancelled.

The implementer user is presented with a flow through section 509 (resembling that of section 423 of screen 400), but includes the additional fields of Pending and Jeopardy. The screen 500 additionally includes a section 511 for messages and alerts as well as a section 513 for new ticket notes. Furthermore, an additional alert section 515 is displayed to permit description from sales agents regarding a particular order; the section 515 includes a Sales ID field, a Code field, and Description field.

The contrast of the positioning of messages and alerts 511 within screen 511, as differentiated from messages and alerts 415 of screen 400, illustrates how the positioning of a screen element is directed by the role-based rules as applied by the presentation subsystem 121.

Figure 6A:
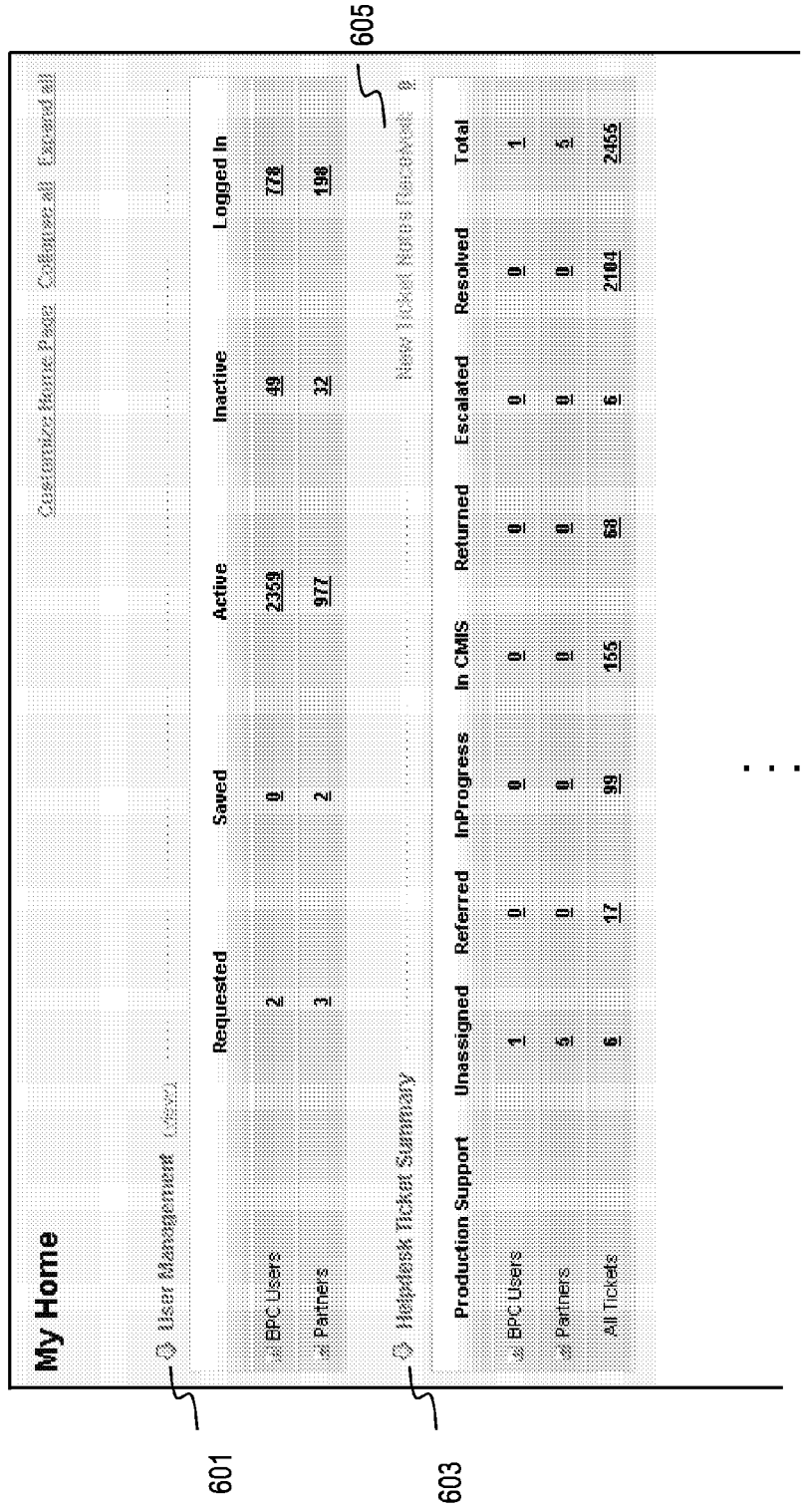
Figure 6B:
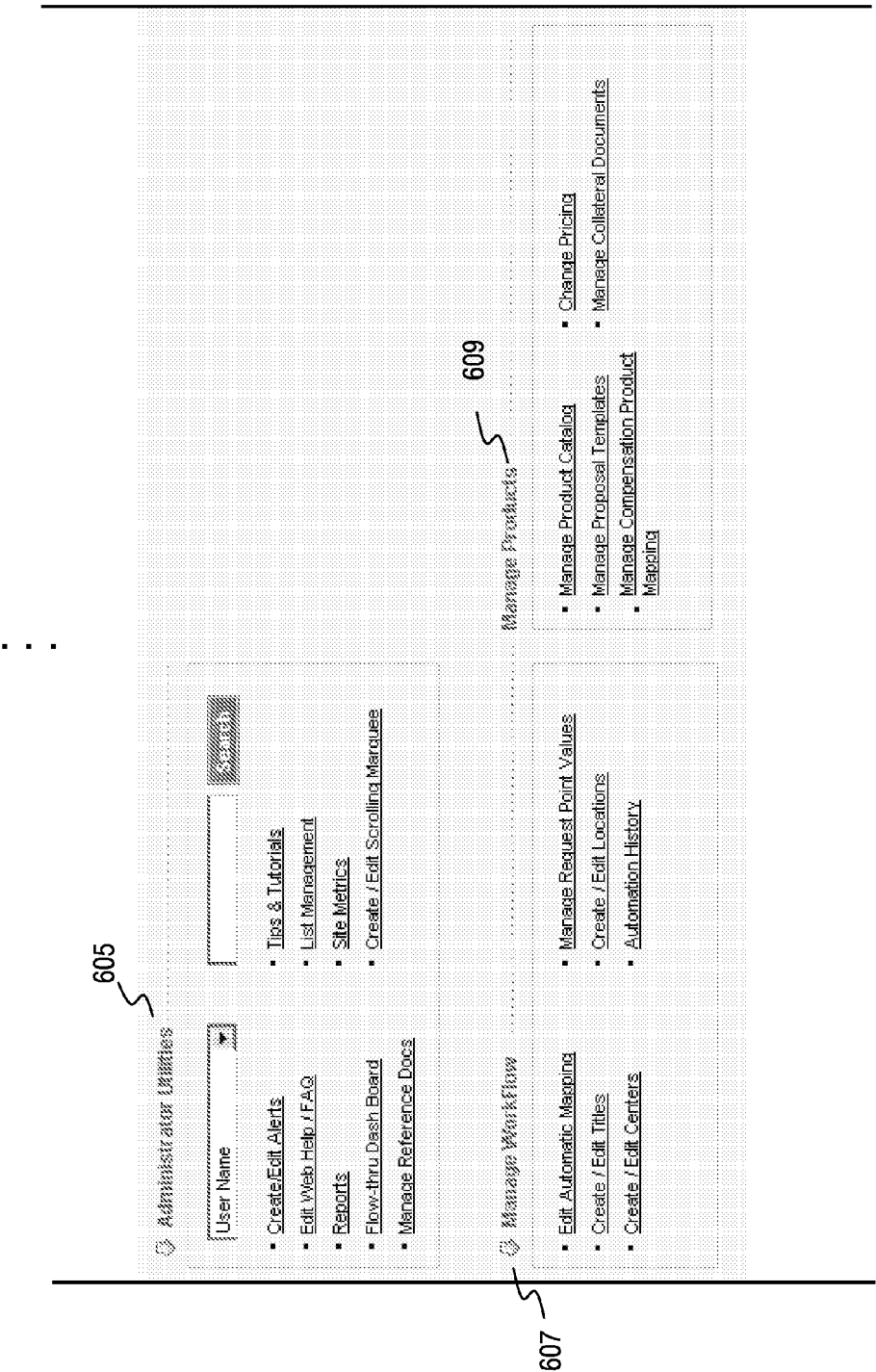

FIGS. 6A-6C are an exemplary GUI for a user in the role of an administrator, according to an exemplary embodiment. Screen 600 is tailored for a user with an administrator role. A User Management section 601 permits the administrator to view the users registered with the sales order automation system 100. Additionally, a Helpdesk Ticket Summary section 603 is included in the screen 600 to provide a report on all help desk activities.

In addition, as seen in FIG. 6B, the screen 600 provides for access to various applications within an Administrator Utilities section 605 and within a Manage Workflow section 607. A Manage Products section 609 likewise provides a series of applications.

The screen 600 further displays a Flow Through Requests section 611 (FIG. 6C). The differing data contents within the Flow Through Requests sections 611, 423 (of screen 400), and 509 (of screen 500) can be attributed to the different information population as directed by the user-based rules applied by the presentation subsystem 121. Such inclusions or exclusions of information are representative of differences in data security. Those inclusions or exclusions may also be based on simple screen design decisions (e.g., space available).

A Message and Alerts section 613 of screen 600 is located at the bottom of the screen 600. The user, in this instance, is provided with a Fallout Fax section 615 to indicate status of faxes. Further, a Ticket Follow-ups section 617 includes a calendar application.

The above described processes relating to access control may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 7:
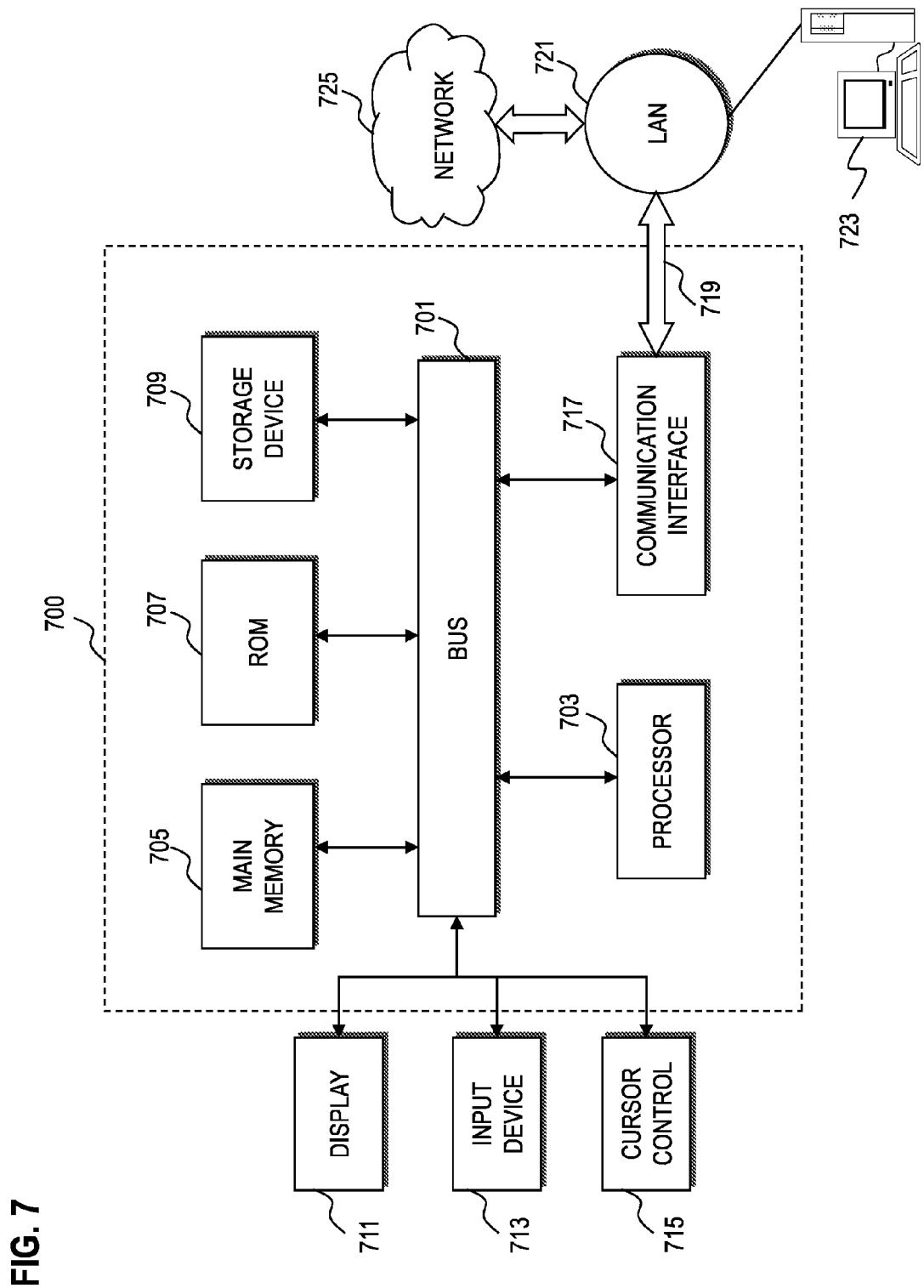
FIG. 7 is a diagram of a computer system that can be used to implement various exemplary embodiments.

FIG. 7 illustrates a computer system 700 upon which an exemplary embodiment can be implemented. For example, the processes described herein can be implemented using the computer system 700. The computer system 700 includes a bus 701 or other communication mechanism for communicating information and a processor 703 coupled to the bus 701 for processing information. The computer system 700 also includes main memory 705, such as a random access memory (RAM) or other dynamic storage device, coupled to the bus 701 for storing information and instructions to be executed by the processor 703. Main memory 705 can also be used for storing temporary variables or other intermediate information during execution of instructions by the processor 703. The computer system 700 may further include a read only memory (ROM) 707 or other static storage device coupled to the bus 701 for storing static information and instructions for the processor 703. A storage device 709, such as a magnetic disk or optical disk, is coupled to the bus 701 for persistently storing information and instructions.

The computer system 700 may be coupled via the bus 701 to a display 711, such as a cathode ray tube (CRT), liquid crystal display, active matrix display, or plasma display, for displaying information to a computer user. An input device 713, such as a keyboard including alphanumeric and other keys, is coupled to the bus 701 for communicating information and command selections to the processor 703. Another type of user input device is a cursor control 715, such as a mouse, a trackball, or cursor direction keys, for communicating direction information and command selections to the processor 703 and for controlling cursor movement on the display 711.

According to one embodiment of the invention, the processes described herein are performed by the computer system 700, in response to the processor 703 executing an arrangement of instructions contained in main memory 705. Such instructions can be read into main memory 705 from another computer-readable medium, such as the storage device 709. Execution of the arrangement of instructions contained in main memory 705 causes the processor 703 to perform the process steps described herein. One or more processors in a multi-processing arrangement may also be employed to execute the instructions contained in main memory 705. In alternative embodiments, hard-wired circuitry may be used in place of or in combination with software instructions to implement the exemplary embodiment. Thus, exemplary embodiments are not limited to any specific combination of hardware circuitry and software.

The computer system 700 also includes a communication interface 717 coupled to bus 701. The communication interface 717 provides a two-way data communication coupling to a network link 719 connected to a local network 721. For example, the communication interface 717 may be a digital subscriber line (DSL) card or modem, an integrated services digital network (ISDN) card, a cable modem, a telephone modem, or any other communication interface to provide a data communication connection to a corresponding type of communication line. As another example, communication interface 717 may be a local area network (LAN) card (e.g. for Ethernet™ or an Asynchronous Transfer Model (ATM) network) to provide a data communication connection to a compatible LAN. Wireless links can also be implemented. In any such implementation, communication interface 717 sends and receives electrical, electromagnetic, or optical signals that carry digital data streams representing various types of information. Further, the communication interface 717 can include peripheral interface devices, such as a Universal Serial Bus (USB) interface, a PCMCIA (Personal Computer Memory Card International Association) interface, etc. Although a single communication interface 717 is depicted in FIG. 7, multiple communication interfaces can also be employed.

The network link 719 typically provides data communication through one or more networks to other data devices. For example, the network link 719 may provide a connection through local network 721 to a host computer 723, which has connectivity to a network 725 (e.g. a wide area network (WAN) or the global packet data communication network now commonly referred to as the "Internet") or to data equipment operated by a service provider. The local network 721 and the network 725 both use electrical, electromagnetic, or optical signals to convey information and instructions. The signals through the various networks and the signals on the network link 719 and through the communication interface 717, which communicate digital data with the computer system 700, are exemplary forms of carrier waves bearing the information and instructions.

The computer system 700 can send messages and receive data, including program code, through the network(s), the network link 719, and the communication interface 717. In the Internet example, a server (not shown) might transmit requested code belonging to an application program for implementing an exemplary embodiment through the network 725, the local network 721 and the communication interface 717. The processor 703 may execute the transmitted code while being received and/or store the code in the storage device 709, or other non-volatile storage for later execution. In this manner, the computer system 700 may obtain application code in the form of a carrier wave.

The term "computer-readable medium" as used herein refers to any medium that participates in providing instructions to the processor 703 for execution. Such a medium may take many forms, including but not limited to non-volatile media, volatile media, and transmission media. Non-volatile media include, for example, optical or magnetic disks, such as the storage device 709. Volatile media include dynamic memory, such as main memory 705. Transmission media include coaxial cables, copper wire and fiber optics, including the wires that comprise the bus 701. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the various exemplary embodiments may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that flow. The specification and the drawings are accordingly to be regarded in an illustrative rather than restrictive sense.

What is claimed is:

1. A method comprising:
    determining by an apparatus one of a plurality of groups associated with a user, wherein grouping of the user is based on at least one criterion, wherein the at least one criterion includes a sale channel that specifies an internal sales representative and an external sales representative;
    populating by the apparatus one presentation interface with sales related information based on the determined group,
        wherein the presentation interface displays:
        a first section specifying sales assignment information,
        a second section specifying status of work queues corresponding to sales orders,
        a third section specifying a calendar including one or more viewing privileges of the user, and
        a fourth section specifying missed and queued communications, in connection with the calendar, wherein the communications include one or more missed calls, and
        wherein the status of work queues is defined according to on-hold, unassigned, in queue, assigned, pending, in-progress, or a combination thereof; and
    restricting the user access to report information, workflow applications, and sales related information according to the at least one criterion and the one or more viewing privileges of the user,
        wherein access by the user to the one or more missed calls in connection with the calendar is restricted according to the internal sales representative or the external sales representative specified in the sale channel.

2. A method according to claim 1, wherein the at least one criterion includes user type, role, or a combination thereof, wherein the role specifies a predetermined set of job functions, and wherein positioning of elements within each of the sections is directed by the role.

3. A method according to claim 1, further comprising:
    permitting the user access to sales related information of another one of the user according to the at least one criterion and the one or more viewing privileges of the user; and
    tracking one or more sale leads, one or more sale orders, or a combination thereof, based upon the one or more missed calls.

4. A method according to claim 1, wherein the presentation interface is configured according to user group preference.

5. A method according to claim 1, wherein the presentation interface further displays a work queue of the user, wherein the work queue is defined according to assigned, firmed, expired, saved, declined, sent, or a combination thereof.

6. A method according to claim 1, wherein the presentation interface further displays,
    a fifth section specifying sales activities,
    a six section specifying compensation information that depends on one or more sales funnels, the compensation information is viewable depending on the viewing privileges of the user,
    a seventh section specifying contract management, and
    an eight section specifying status of data flow-through that depends on the viewing privileges of the user.

7. A method according to claim 1, wherein the presentation interface includes a graphical user interface (GUI).

8. A method according to claim 1, wherein the second section further displays a sales funnel that lists the sales orders defined according to core, customer premises equipment (CPE), and growth.

9. A method according to claim 6, wherein the presentation interface displays a ninth section specifying a quality measurement plan (QMP) and a process variation (PV) that detail quarterly sales information.

10. A method according to claim 9, wherein the presentation interface displays a tenth section specifying order requests from sales engineers, the order requests are defined according to saved, in queue, assigned, in progress, completed, or a combination thereof.

11. A method according to claim 1, wherein the missed and queued communications are selectively displayed on the calendar to a user with viewing privileges.

12. A method according to claim 1, further comprising:
populating by the apparatus a second presentation interface for a sales order implementer,
wherein the second presentation interface displays:
a first section specifying the sales orders,
a second section specifying a number of one or more rejected orders,
a third section specifying numbers of one or more orders that are assigned, in progress, pending, jeopardy, errors, and completed,
a fourth section specifying one or more messages and alerts regarding the sale orders, and
a fifth section specifying status of data flow-through that depends on the viewing privileges of the sales order implementer.

13. A method according to claim 1, further comprising:
populating by the apparatus a third presentation interface for a sales order automation administrator,
wherein the third presentation interface displays:
a first section specifying status of registered users,
a second section specifying one or more help desk activities,
a third section specifying administrator utilities applications,
a fourth section specifying workflow management applications,
a fifth section specifying product management applications,
a sixth section specifying one or more messages and alerts regarding the sale orders,
a seventh section specifying status of data flow-through that depends on the viewing privileges of the sales order automation administrator, and
an eighth section specifying a calendar including one or more helpdesk ticket follow-ups.

14. An apparatus comprising:
a processor configured to determine one of a plurality of groups associated with a user, wherein grouping of the user is based on at least one criterion, wherein the at least one criterion includes a sale channel that specifies an internal sales representative and an external sales representative, and the processor is further configured to populate one presentation interface with sales related information based on the determined group and one or more viewing privileges of the user, wherein the presentation interface displays:
a first section specifying sales assignment information,
a second section specifying status of work queues corresponding to sales orders,
a third section specifying a calendar including one or more viewing privileges of the user, and
a fourth section specifying missed and queued communications, in connection with the calendar, wherein the communications include one or more missed calls, and
wherein the status of work queues is defined according to on-hold, unassigned, in queue, assigned, pending, in-progress, or a combination thereof; and
restricting the user access to report information, workflow applications, and sales related information according to the at least one criterion and the one or more viewing privileges of the user,
wherein access by the user to the one or more missed calls in connection with the calendar is restricted according to the internal sales representative or the external sales representative specified in the sale channel.

15. An apparatus according to claim 14, wherein the at least one criterion includes user type, role, or a combination thereof, wherein the role specifies a predetermined set of job functions.

16. An apparatus according to claim 15, wherein the processor is further configured to restrict the user access to report information or workflow applications according to the at least one criterion.

17. An apparatus according to claim 15, wherein the processor is further configured to permit the user access to sales related information of another one of the user according to the at least one criterion.

18. An apparatus according to claim 14, wherein the presentation interface is configured according to user preference.

19. An apparatus according to claim 14, wherein the presentation interface specifies sales activities, compensation information, and a work queue of the user, wherein the work queue is defined according to assigned, firmed, expired, saved, declined, sent, or a combination thereof.

20. A non-transitory computer-readable storage medium carrying one or more instructions which, when executed by one or more processors, cause an apparatus to at least perform the following steps:
determining one of a plurality of groups associated with a user, wherein grouping of the user is based on at least one criterion, wherein the at least one criterion includes a sale channel that specifies an internal sales representative and an external sales representative;
populating by the apparatus one presentation interface with sales related information based on the determined group,
wherein the presentation interface displays:
a first section specifying sales assignment information,
a second section specifying status of work queues corresponding to sales orders,
a third section specifying a calendar including one or more viewing privileges of the user, and
a fourth section specifying missed and queued communications, in connection with the calendar, wherein the communications include one or more missed calls, and
wherein the status of work queues is defined according to on-hold, unassigned, in queue, assigned, pending, in-progress, or a combination thereof; and
restricting the user access to report information, workflow applications, and sales related information according to the at least one criterion and the one or more viewing privileges of the user,
wherein access by the user to the one or more missed calls in connection with the calendar is restricted according to the internal sales representative or the external sales representative specified in the sale channel.

21. A non-transitory computer-readable storage medium according to claim 20, wherein the at least one criterion includes user type, role, or a combination thereof, wherein the role specifies a predetermined set of job functions.

22. A non-transitory computer-readable storage medium according to claim 20, wherein the apparatus is further perform restricting the user access to report information or workflow applications according to the at least one criterion.

* * * * *